United States Patent
Bharadwaj et al.

(10) Patent No.: US 12,505,671 B2
(45) Date of Patent: Dec. 23, 2025

(54) METHOD AND SYSTEM FOR AUTOMATICALLY REFRAMING AND TRANSFORMING VIDEOS OF DIFFERENT ASPECT RATIOS

(71) Applicant: PRIME FOCUS TECHNOLOGIES LTD., Bengaluru (IN)

(72) Inventors: Harish Shreedhara Bharadwaj, Bengaluru (IN); Muralidhar Kolar Sridhar, Bengaluru (IN); Nitesh Kumar . M, Chennai (IN); Suhas Kodandaram Jamadagni, Mysuru (IN); Shubham Jaiswal, Pune (IN); Chiranjit Ghosh, Bangalore (IN)

( * ) Notice: Subject to any disclaimer, the term of this patent is extended or adjusted under 35 U.S.C. 154(b) by 0 days.

(21) Appl. No.: 18/807,882

(22) Filed: Aug. 16, 2024

(65) Prior Publication Data
US 2025/0061714 A1 Feb. 20, 2025

(30) Foreign Application Priority Data
Aug. 18, 2023 (IN) .............................. 202341055592

(51) Int. Cl.
*G06V 20/40* (2022.01)
*G06T 5/70* (2024.01)
(Continued)

(52) U.S. Cl.
CPC ............... *G06V 20/42* (2022.01); *G06T 5/70* (2024.01); *G06T 7/20* (2013.01); *G06V 10/25* (2022.01);
(Continued)

(58) Field of Classification Search
None
See application file for complete search history.

(56) References Cited

U.S. PATENT DOCUMENTS 6,473,522 B1 * 10/2002 Lienhart .................. G06T 7/11
382/164
9,191,554 B1 * 11/2015 Manohar ................. G06F 40/10
(Continued)

*Primary Examiner* — Clifford Hilaire
(74) *Attorney, Agent, or Firm* — Goudle, PLLC

(57) ABSTRACT

The present invention provides a method and system for automatically reframing and transforming videos to different aspect ratios, such that the source video has a fixed resolution and multiple outputs of different aspect ratios are generated. The present invention automatically reframes and transforms horizontal videos into vertical, portrait, square, and/or landscape for social media distribution. The method comprises acquiring input video details; extracting audio; detecting shot change points and extracting frames; detecting salient regions; detecting text; generating and stabilizing viewports; applying genre-specific transformations and generating transformed images; recreating text; obtaining output frames; generating videos and uploading the reframed and transformed videos into cloud. The present invention helps to reframe and transform videos by maintaining the visibility of regions of interest. Furthermore, the present invention helps to create multiple content variants, and ready-to-distribute videos to the social media platforms by retaining contextually important text and moments and rapidly monetizing content.

20 Claims, 8 Drawing Sheets

(51) Int. Cl.
  *G06T 7/20* (2017.01)
  *G06V 10/25* (2022.01)
  *G06V 10/46* (2022.01)
  *G06V 10/54* (2022.01)
  *G06V 10/56* (2022.01)
  *G06V 10/74* (2022.01)

(52) U.S. Cl.
  CPC ............ *G06V 10/462* (2022.01); *G06V 10/54* (2022.01); *G06V 10/56* (2022.01); *G06V 10/761* (2022.01); *G06T 2207/30241* (2013.01)

(56) References Cited

U.S. PATENT DOCUMENTS

| | | | |
|---|---|---|---|
| 2004/0125877 A1* | 7/2004 | Chang | G06F 16/739 |
| | | | 348/E5.065 |
| 2009/0245626 A1* | 10/2009 | Norimatsu | G06V 10/25 |
| | | | 382/164 |
| 2019/0325746 A1* | 10/2019 | Lewis | G06F 3/013 |

* cited by examiner 602  604

606  608

622   624

626

METHOD AND SYSTEM FOR AUTOMATICALLY REFRAMING AND TRANSFORMING VIDEOS OF DIFFERENT ASPECT RATIOS

The present application claims the priority of the Indian Provisional Patent Application No. 202341055592, filed on Aug. 18, 2023, and titled "A METHOD AND SYSTEM FOR AUTOMATICALLY REFRAMING AND TRANSFORMING VIDEOS OF DIFFERENT ASPECT RATIOS." The contents of the abovementioned IN Provisional Patent Application are incorporated herein in their entirety by way of reference.

BACKGROUND OF THE INVENTION

The present invention is generally related to the field of video processing. The present invention is particularly related to a method and system for automatically reframing and transforming videos of different aspect ratios. The present invention is more particularly related to a method and system for automatically reframing and transforming horizontal videos into vertical, portrait, square, and/or landscape for social media distribution.

Social media is not just about uploading content. Media houses produce about 10K to 15K videos yearly and news outlets release about 100+ videos daily leading broadcasters and streaming companies to turn to social media to monetize content; both new and legacy. For audiences, social media has become the go-to place for watching their favorite video content. In addition, with content acquisition and production costs rising by ~30% year on year, content monetization has become a top priority. Expanding viewers and diversifying traffic by reaching out to a newer fan base globally has become paramount, leading to an exponential demand to create and distribute snackable, scroll-stopping social media content at scale. Videos have an audience reach of 92% worldwide because they offer the opportunity to tell a story, build trust in a brand, and have a hard-to-beat ROI. Also, users tend to retain 95% of the messages watched on videos when compared to text messages.

Moreover, users often desire to reframe a video from an initial aspect ratio to a different aspect ratio. An aspect ratio refers to the width of a video in relation to the height of the video and can be expressed in width by height. For instance, various channels (e.g., social media, websites, and devices) require videos to be in specific aspect ratios. Accordingly, when a video is posted or played on a particular channel, the video may need to be edited from one aspect ratio to another aspect ratio to reframe the video to the specific aspect ratio for that particular channel.

A) Subsequently, most of the video content produced is in 16:9 format. The marketing, creative, and post-production teams spend hours resizing and reframing separate video clips, adding motion keyframes, and adjusting embedded captions. Some of the prominent challenges for achieving the social media video content reframing and distribution goals across enterprise teams are limited budgets to create and distribute content on all social apps quickly; skilled manual video reframing which is expensive, slow, and not scalable; contextualizing the content for different social media apps; rendering the video content output with quick previews to avoid rework; and repurposing archived content in new and innovative ways. Also, trained human editors spend a lot of manual time reframing it. Furthermore, AI-assisted editors are available to perform partial reframing and edit the solutions. However, both are time-consuming, require editing software on each desktop, and powerful video rendering machines, and cannot scale out on need at optimal costs.

Hence, in view of this, there is a need for a method and system for automatically reframing and transforming videos of different aspect ratios at a faster rate, reducing cost per video, increasing scale non-linearly with no edit machines, no long lead times, works round-the-clock on a cloud, and scales on need.

The above-mentioned shortcomings, disadvantages and problems are addressed herein, and which will be understood by reading and studying the following specification.

The primary object of the present invention is to provide a method and system for automatically reframing and transforming videos of different aspect ratios.

Another object of the present invention is to provide a method and system for automatically reframing and transforming videos, such that the videos can be readily posted on various social media destinations.

Yet another object of the present invention is to automatically reframe videos using genre-specific transformations.

Yet another object of the present invention is to employ genre-specific reframing including shows, episodic, movies, cricket, soccer, promos, etc.

Yet another object of the present invention is to automatically recognize water marks and processing.

Yet another object of the present invention is to provide automatic text recreation.

Yet another object of the present invention is to provide multi-lingual text re-creation in various languages with automatic self-detection and recreation.

Yet another object of the present invention is to provide automatic detection of text spread and text protection.

Yet another object of the present invention is to provide automatic stabilization of the focused viewports and multiple viewports to eliminate visual jitter caused by reframing.

Yet another object of the present invention is to provide automatic reframing powered by spatio-temporal content analysis along with human detection.

Yet another object of the present invention is to provide automatic recognition and elimination of black bands and pillar bars in content before reframing.

Yet another object of the present invention is to reframe multiple resolutions in parallel by recognizing and analyzing the source video once.

Yet another object of the present invention is to provide selective configuration and choice of transformations on a per tenant, per genre, and per video basis.

These and other objects and advantages of the present invention will become readily apparent from the following detailed description taken in conjunction with the accompanying drawings.

SUMMARY OF THE INVENTION

The various embodiments of the present invention provides a method and system for automatically reframing and transforming videos of different aspect ratios. The present invention provides a method and system for automatically reframing and transforming horizontal videos into vertical, portrait, square, and/or landscape for social media distribution. The method comprises the following steps: acquiring input video details; extracting audio; detecting shot change points and extracting frames; detecting saliency models; detecting text; detecting horizontal text box; calculating continuity of text boxes; reading on-screen text using OCR; generating mask; generating and stabilizing viewports; applying transformations and generating transformed images; recreating text; obtaining output frames; generating videos and uploading reframed and transformed videos into cloud. The present invention thus helps to reframe and transform videos from one aspect ratio to another aspect ratio while maintaining the visibility of regions of interest. Furthermore, the present invention also helps to create multiple content variants, and ready-to-distribute videos to social media platforms by retaining contextually important text and moments and rapidly monetizing content.

According to one embodiment of the present invention, a method for automatically reframing and transforming videos of different aspect ratios is provided. The method comprises acquiring input comprising source video details in different formats, output reframed resolutions in which the source video is to be converted, and the genre of the source video. The method further involves extracting audio from the source video. In addition, the method involves identifying shot change points based on visual data points and extracting frames from the input source video. The method further involves detecting saliency based on the input genre of the source video by processing the source video through saliency models. The saliency models are a combination of image and video models. The method further involves detecting text at a sampling interval. Moreover, the method involves generating viewports using salient frames, stabilizing the generated viewports to avoid the jittering effect, and creating a smooth video by cropping the viewports into a separate video. The method further involves generating transformations to ensure that a focus region does not fit into a default viewport, and automatically transforming the focus region to provide transformed images to a viewer. Furthermore, the method involves recreating the text that does not fully fit into a reframed output and involving background graphics or reproducing the text devoid of background graphics. If the text has background graphics, then the method involves recreating the text, or else to reproduce the text. In addition, the method involves obtaining output frames, by cropping the frames from the viewport and applying creative transformations and text transformations. Further, the method involves generating a transformed video by merging the cropped frames, adding the extracted audio, and uploading the reframed and transformed video into the cloud.

According to one embodiment of the present invention, the source video in different formats includes mp4 format, AVI, MOV, or WMV in different containers, extensions, and codecs.

According to one embodiment of the present invention, the audio is extracted from the source video using a multimedia processing tool, such as ffmpeg. The multimedia processing tool reads the input source video file, separates the audio track in the media from the video track, and saves the audio in WAV file format.

According to one embodiment of the present invention, the shot change points are the moments in the source video where a noticeable transition takes place, denoting a change in scenes or camera perspectives. These are important considerations for segmenting and analyzing videos. The shot change point detection relies heavily on visual data points. Furthermore, the visual data points include color distribution, motion patterns, and keyframe dissimilarities, among other visual features. These visual clues are used by an algorithm to detect changes in content or presentation style, and also accurately identify the exact moments when the shot change takes place.

According to one embodiment of the present invention, while detecting saliency each shot is processed individually, in which the frames are processed into batches, the motion is captured and the most focused region of the frames is provided as output, which is a salient frame.

According to one embodiment of the present invention, the saliency models help to identify visually prominent regions within the source video, and they mimic human visual attention mechanisms, highlighting areas that are likely to attract attention. The method for processing the source video through the saliency model is provided. The method includes extracting key features and generating saliency maps that highlight distinctive areas. For videos, temporal integration is often applied. The method further includes identifying significant regions of interest (ROIs) using generated saliency maps, which guide attention-weighted analysis. The extracted saliency information is valuable for various tasks, such as content summarization, object recognition, and adaptive video compression, enhancing the efficiency and effectiveness of video processing in diverse applications.

According to one embodiment of the present invention, text detection is performed at a sampling interval of 0.25 seconds to identify and extract textual information from images and videos. Furthermore, text detection involves detecting text horizontally, calculating the continuity of the text boxes, reading text using Optical Character Recognition (OCR), and generating a mask.

According to one embodiment of the present invention, the method for detecting the text is provided. The method involves improving the image quality through preprocessing and pinpointing potential text regions using edge detection. The method further involves analyzing the pinpointed potential text regions for distinctive features, such as texture and color. In addition, the method involves classifying the distinctive features as text or non-text using a machine learning model, and creating bounding boxes around detected text areas.

According to one embodiment of the present invention, detecting text horizontally involves calculating the orientation of text boxes using (x, y) coordinates of text boxes; eliminating all the text boxes that are at an angle greater than the threshold concerning the bottom border of the frame; and eliminating the text boxes that encompass vertical texts, to ensure that the text detected on screen is overlay text and not scene text.

According to one embodiment of the present invention, calculating the continuity of the text boxes involves calculating continuity on the screen based on text bounding boxes for each text box and if the text box is constantly present on screen for a threshold duration, then classifying the text as valid for retainment. The threshold duration is decided based on genre.

According to one embodiment of the present invention, reading text using Optical Character Recognition (OCR) is performed to eliminate false positives once continuous text segments are identified, and also the text bound boxes from OCR are used to identify tight-fit bounding boxes of continuous text on the screen.

According to one embodiment of the present invention, generating a mask involves creating a mask using the text bound boxes to isolate text in the frame to be re-created or reproduced. The generated mask is white when text is present on the screen, or black when text is not present.

According to one embodiment of the present invention, the method for generating viewports using salient frames is provided. The method includes processing the salient frames to obtain the most focused regions identified at high and low thresholds; iterating the process throughout the image to find the best fit for all the output viewports; dividing the image into multiple quadrants and calculating the spread of most focused region based on quadrant occupancies; feeding the spread and quadrant occupancies to a series of predefined rules and deciding the type of transformations required for each frame; and iterating the process for each of the salient frames to obtain viewports for each frame.

According to one embodiment of the present invention, the method also provides selective configuration and choice of transformations on a per tenant, per genre, and per video basis. Each customer is provided a tenant, such that the assets invested in a tenant can typically be categorized into a specific genre based on the type of content within, such as General Entertainment Content (GEC), news debate, music video, etc. Music Videos are typically fast changing and with significant motion. News Debates could have multiple windows and rolling text in the frame, while General Entertainment Content might not have any of the above variations. Furthermore, the tenant can have multiple videos in its library spanning across the different genres possible. Also, each video needs to be transformed based on its underlying content. For instance, a "Creative Editor 1" can transform a video with two vertical windows whereas a "Creative Editor 2" can transform the same video with three vertical windows. Therefore, to accommodate this wide range of choice of transformations and creative requirements, the method provides configurations to choose transformations on a per tenant, per genre, and per video basis.

According to one embodiment of the present invention, text recreation involves blurring the text background and ensuring that the text does not overlap with any background graphics. The blurring of the text involves blurring the area in the frame where text bound boxes are present to avoid text overlap between frame text and recreated or reproduced text. The recreation of the text is carried out if there is background graphics on the text. While recreating the text, the text in the source frame is copied and placed over the blurred area in the output frame, and the text bounding boxes are expanded to encompass background graphics behind the text.

According to one embodiment of the present invention, the reproduction of text is carried out when there is no background graphics on the text. The reproduction of the text is performed by reproducing the text in the source frame using text data which is identified using OCR on the blurred area in the output frame. The font of the reproduced text may be chosen at the time of video ingestion, and the reproduced text will have a shadow effect applied to it.

According to one embodiment of the present invention, the creative transformations are applied over the original horizontal frame, and converted to frames that are well suited to be viewed in vertical space. Further, the creative transformations include fit to saliency/fit to focus, full and focused, split vertical, fit to width, compact (vertical, horizontal, diagonal split), split in time, text recreation, and text protection.

According to one embodiment of the present invention, the method also provides automatic reframing powered by spatio-temporal content analysis along with human detection. The spatio-temporal content analysis is used to identify the regions of interest in a video. This is based on the fact that, when a user watches the video, the user's eyes will automatically fixate on the most happening/interesting regions of the video. To identify this fixation in the video, the algorithm analyses a set of sequential frames to determine the regions where there is a significant amount of motion that sustains across the entire sequence of frames. Since the algorithm not only uses the information present in a frame but also the details of a given sequence of frames, this approach is referred to as a spatio-temporal analysis. Since the results of the spatio-temporal analysis are based on motion, when there is widespread motion involving multiple regions with the presence of humans, it can so happen that some of the regions with less motion but an interesting relevance are missed out. To overcome this shortcoming, user detection is employed and used to curate the final output.

According to one embodiment of the present invention, the method also recognizes automatically and eliminates the black bands and pillar bars in content before reframing. The black bands/pillar bars are post-production elements added to the video to adhere to the required aspect ratio. When a video with black bands/pillar bars is reframed, the black bands/pillar bars also form a part of the reframed content and have an undesirable viewing experience. To overcome this the algorithm identifies the presence of the bars/pillars as a pre-processing step and uses this information to remove these bands in the final reframed output.

According to one embodiment of the present invention, the method further includes performing a real-time ball tracking in sports videos by: capturing one or more ball locations using object detection models or optimized zero-shot detection frameworks and shot-based processing with frames analyzed in batches, capturing one or more prominent regions in shots where the ball is present while excluding irrelevant shots, handling misdetections and intermittent ball detection with interpolation based on previous and next ball locations, followed by a weighted average of ball locations to stabilize and handle shaky viewports for ensuring smooth tracking, and managing occlusions by predicting the ball's trajectory and re-identifying it post-occlusion.

According to one embodiment of the present invention, the method further includes generating a thumbnail by: extracting one or more key frames from the video at 1 frame per second (fps); filtering and ranking the one or more key frames based on the at least one of a) blurriness, where clear frames are ranked higher, b) person presence where the frames with the person are preferred, c) frontal face where the frames with frontal faces are ranked higher, d) key frames where the key frames are given a higher rank, and selecting the top k filtered frames as the final thumbnails.

According to one embodiment of the present invention, the method further includes overlaying of subtitle on reframe video by: processing the asset through a speech-to-text engine to generate subtitle files based on the horizontal video rules, modifying the generated subtitle to fit vertical video rules, and burning the subtitle file onto the reframed video.

According to one embodiment of the present invention, the method further includes overlaying of subtitle on reframe video by: burning the SRT file uploaded by the user during asset ingestion onto the reframed video.

According to one embodiment of the present invention, the method further includes overlaying a logo on reframe video by: integrating and burning the logo onto the reframed video to maintain consistent branding, choosing a desired position for the logo overlay by the user from at least one of a) top-left, b) top-right, c) bottom-left, d) bottom-right and e) center, and resizing the logo to fit the specific dimensions of the reframed video without losing clarity, and transparency and adjusting the opacity levels to ensure it blends well with the video content.

According to one embodiment of the present invention, a system for automatically reframing and transforming videos of different aspect ratios is provided. The system comprises an input module configured to acquire input comprising source video details in different formats, output reframed resolutions in which the source video is to be converted, and the genre of the source video. The system further comprises an audio extraction module configured to extract audio from the source video. In addition, the system comprises a frame extraction module configured to identify shot change points based on visual data points and extract frames from the input source video. The system further comprises a saliency detection module configured to detect saliency based on the input genre of the source video by processing the source video through saliency models, which are a combination of image and video models. Furthermore, the system comprises a text detection module configured to detect text at a sampling interval. The system further comprises a viewport generation module configured to generate viewports using salient frames, and a viewport stabilization module configured to stabilize the generated viewports to avoid the jittering effect and create a smooth video by cropping the viewports into a separate video. Furthermore, the system comprises a transformation generation module configured to generate transformations to ensure that a focus region does not fit into a default viewport and automatically transforms the focus region to provide transformed images to a viewer. In addition, the system comprises a text recreation module configured to recreate text that does not fully fit into a reframed output and involves background graphics or configured to reproduce the text, that is devoid of background graphics. Furthermore, the system comprises a frame output module configured to provide output frames, by cropping the frames from the viewport and also configured to apply respective creative transformations and text transformations. In addition, the system comprises a video generation module configured to generate a transformed video by merging the cropped frames, adding the extracted audio by the audio extraction module to the transformed video, and also configured to upload the reframed and transformed video into the cloud.

According to one embodiment of the present invention, the source video in different formats includes mp4 format, AVI, MOV, or WMV in different containers, extensions, and codecs.

According to one embodiment of the present invention, the audio extracted by the audio extraction module from the source video uses a multimedia processing tool, such as ffmpeg. The multimedia processing tool is configured to read the input source video file, separate the audio track in the media from the video track, and save the audio in WAV file format.

According to one embodiment of the present invention, the shot change points identified by the frame extraction module are the moments in the source video where a noticeable transition takes place, denoting a change in scenes or camera perspectives. These are important considerations for segmenting and analyzing videos. The shot change point detection relies heavily on visual data points. Furthermore, the visual data points include color distribution, motion patterns, and keyframe dissimilarities, among other visual features. These visual clues are used by an algorithm to detect changes in content or presentation style, and also accurately identify the exact moments when the shot change takes place.

According to one embodiment of the present invention, while detecting saliency by the saliency detection module, each shot is processed individually, in which the frames are processed into batches, the motion is captured and the most focused region of the frames is provided as output, which is a salient frame.

According to one embodiment of the present invention, the saliency models of the saliency detection module are configured to identify visually prominent regions within the source video, and they mimic human visual attention mechanisms, highlighting areas that are likely to attract attention. Furthermore, the method for processing the source video through the saliency model by the saliency detection module is provided. The method involves extracting key features, generating saliency maps that highlight distinctive areas, and identifying significant regions of interest (ROIs) using generated saliency maps.

According to one embodiment of the present invention, text detection is performed by the text detection module at a sampling interval of 0.25 seconds, to identify and extract textual information from images and videos. The detection of text by the text detection module further involves detecting text horizontally, calculating the continuity of the text boxes, reading text using Optical Character Recognition (OCR), and generating a mask.

According to one embodiment of the present invention, the method for detecting the text by the text detection module is provided. The method involves improving the image quality through preprocessing and pinpointing potential text regions using edge detection. The method further involves analyzing the pinpointed potential text regions for distinctive features, such as texture and color. In addition, the method involves classifying the distinctive features as text or non-text using a machine-learning model and creating bounding boxes around detected text areas.

According to one embodiment of the present invention, detecting text horizontally by the text detection module involves calculating the orientation of text boxes using (x,y) coordinates of text boxes; eliminating all the text boxes that are at an angle greater than the threshold concerning the bottom border of the frame; and eliminating the text boxes that encompass vertical texts, to ensure that the text detected on screen is overlay text and not scene text.

According to one embodiment of the present invention, calculating the continuity of the text boxes by the text detection module involves calculating continuity on the screen based on text bounding boxes for each text box and if the text box is constantly present on screen for a threshold duration, then classifying the text as valid for retainment. The threshold duration is decided based on genre.

According to one embodiment of the present invention, reading text using Optical Character Recognition (OCR) by the text detection module is performed to eliminate false positives once continuous text segments are identified, and also the text bound boxes from OCR are used to identify tight-fit bounding boxes of continuous text on the screen.

According to one embodiment of the present invention, generating a mask by the text detection module involves creating a mask using the text bound boxes to isolate text in the frame to be re-created or reproduced. The generated mask is white when text is present on the screen, or black when text is not present.

According to one embodiment of the present invention, the method for generating viewports by the viewport generation module using salient frames is provided. The method includes processing the salient frames to obtain the most focused regions identified at high and low thresholds; iterating the process throughout the image to find the best fit for all the output viewports; dividing the image into multiple quadrants and calculating the spread of most focused region based on quadrant occupancies; feeding the spread and quadrant occupancies to a series of predefined rules and deciding the type of transformations required for each frame; and iterating the process for each of the salient frames to obtain viewports for each frame.

According to one embodiment of the present invention, the transformation generation module also provides selective configuration and choice of transformations on a per tenant, per genre, and per video basis. Each customer is provided a tenant, such that the assets invested in a tenant can typically be categorized into a specific genre based on the type of content within, such as General Entertainment Content (GEC), news debate, music video, etc. Music Videos are typically fast changing and with significant motion. News Debates could have multiple windows and rolling text in the frame, while General Entertainment Content might not have any of the above variations. Furthermore, the tenant can have multiple videos in its library spanning across the different genres possible. Also, each video needs to be transformed based on its underlying content. For instance, a "Creative Editor 1" can transform a video with two vertical windows whereas a "Creative Editor 2" can transform the same video with three vertical windows. Therefore, to accommodate this wide range of choice of transformations and creative requirements, the method provides configurations to choose transformations on a per tenant, per genre, and per video basis.

According to one embodiment of the present invention, the text recreation by the text recreation module involves blurring the text background and ensuring that the text does not overlap with any background graphics. The blurring of the text involves blurring the area in the frame where text bound boxes are present to avoid text overlap between frame text and recreated or reproduced text. The recreation of the text is carried out if there is background graphics on the text. While recreating the text, the text in the source frame is copied and placed over the blurred area in the output frame, and the text bounding boxes are expanded to encompass background graphics behind the text. The text recreation further includes identifying all possible text segments in the video frames, using Gen-AI to filter and classify text segments as on-screen text (OST) or background in-video text, and applying fit-text transformation to the filtered/identified OST segments for ensuring clear fitting of the actual On-Screen-text in the vertical reframed viewport.

According to one embodiment of the present invention, the reproduction of text is carried out by the text recreation module when there are no background graphics on the text and is performed by reproducing the text in the source frame using text data which is identified using OCR on the blurred area in the output frame. The font of the reproduced text is chosen at the time of video ingestion, and the reproduced text has a shadow effect applied to it.

According to one embodiment of the present invention, the creative transformations are applied by the frame output module over the original horizontal frame, and converted to frames that are well suited to be viewed in vertical space. The creative transformations include fit to saliency/fit to focus, full and focused, split vertical, fit to width, compact (vertical, horizontal, diagonal split), split in time, text recreation, and text protection.

According to one embodiment of the present invention, the frame output module also provides automatic reframing powered by spatio-temporal content analysis along with human detection. The spatio-temporal content analysis is used to identify the regions of interest in a video. This is based on the fact that, when a user watches the video, the user's eyes will automatically fixate on the most happening/interesting regions of the video. To identify this fixation in the video, the algorithm analyses a set of sequential frames to determine the regions where there is a significant amount of motion that sustains across the entire sequence of frames. Since the algorithm not only uses the information present in a frame but also the details of a given sequence of frames, this approach is referred to as a spatio-temporal analysis. Since the results of the spatio-temporal analysis are based on motion, when there is widespread motion involving multiple regions with the presence of humans, it can so happen that some of the regions with less motion but an interesting relevance are missed out. To overcome this shortcoming, user detection is employed and used to curate the final output.

According to one embodiment of the present invention, the frame output module also recognizes automatically and eliminates the black bands and pillar bars in content before reframing. The black bands/pillar bars are post-production elements added to the video to adhere to the required aspect ratio. When a video with black bands/pillar bars is reframed, the black bands/pillar bars also form a part of the reframed content and have an undesirable viewing experience. To overcome this the algorithm identifies the presence of the bars/pillars as a pre-processing step and uses this information to remove these bands in the final reframed output.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which.

Figure 1:
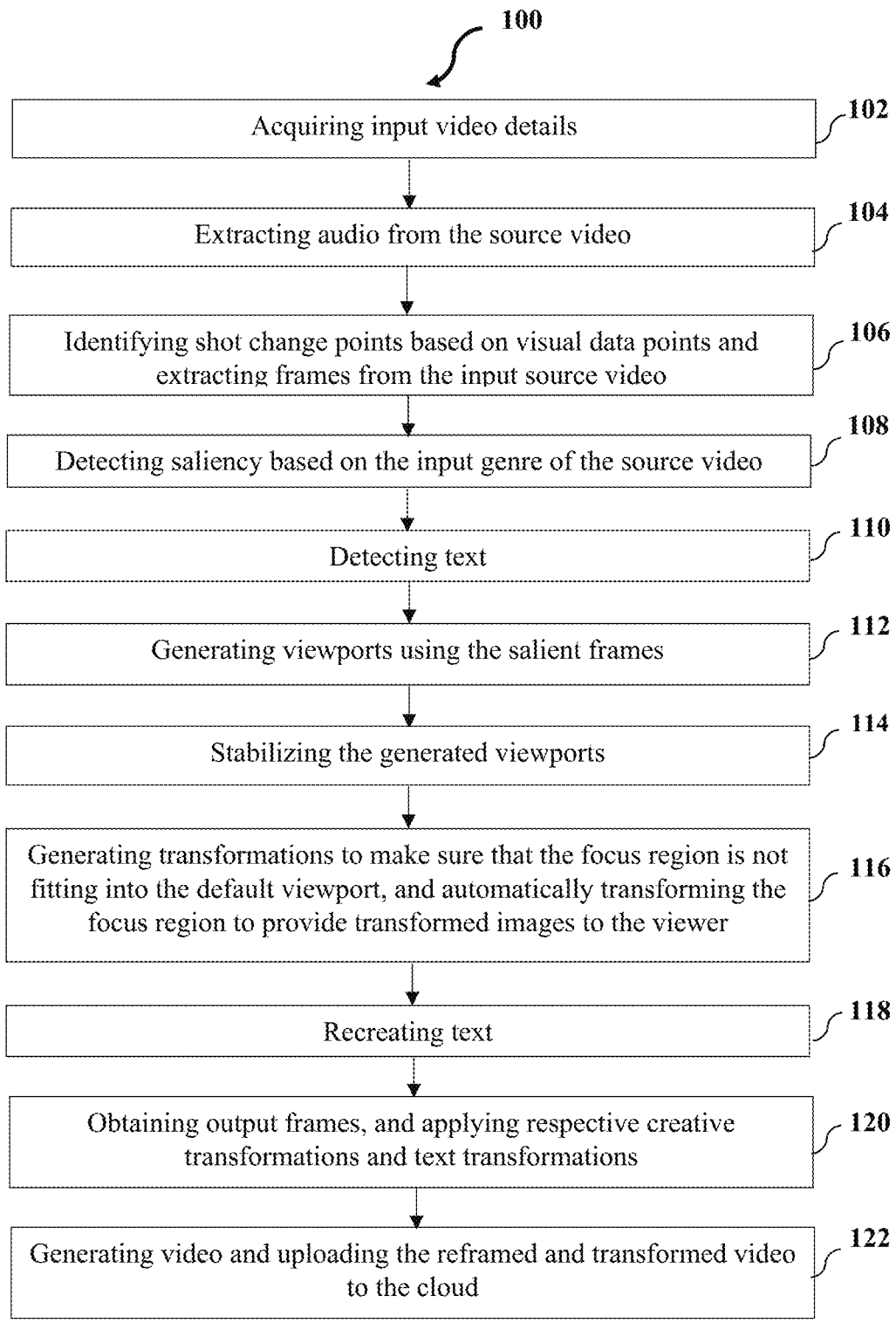
FIG. 1 illustrates a flowchart on a method for automatically reframing and transforming videos of different aspect ratios, according to an embodiment of the present invention.

Although the specific features of the present invention are shown in some drawings and not in others. This is done for convenience only as each feature may be combined with any or all of the other features in accordance with the present invention.

DETAILED DESCRIPTION OF THE INVENTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical, and other changes may be made without departing from the scope of the embodiments. The following detailed description is therefore not to be taken in a limiting sense.

The various embodiments of the present invention provides a method and system for automatically reframing and transforming videos of different aspect ratios. The present invention provides a method and system for automatically reframing and transforming horizontal videos into vertical, portrait, square, and/or landscape for social media distribution. The method comprises the following steps: acquiring input video details; extracting audio; detecting shot change points and extracting frames; detecting saliency models; detecting text; detecting horizontal text box; calculating continuity of text boxes; reading on-screen text using OCR; generating mask; generating and stabilizing viewports; applying transformations and generating transformed images; recreating text; obtaining output frames; generating videos and uploading reframed and transformed videos into cloud. The present invention thus helps to reframe and transform videos from one aspect ratio to another aspect ratio while maintaining the visibility of regions of interest. Furthermore, the present invention also helps to create multiple content variants, and ready-to-distribute videos to social media platforms by retaining contextually important text and moments and rapidly monetizing content.

According to one embodiment of the present invention, a method for automatically reframing and transforming videos of different aspect ratios is provided. The method comprises acquiring input comprising source video details in different formats, output reframed resolutions in which the source video is to be converted, and the genre of the source video. The method further involves extracting audio from the source video. In addition, the method involves identifying shot change points based on visual data points and extracting frames from the input source video. The method further involves detecting saliency based on the input genre of the source video by processing the source video through saliency models. The saliency models are a combination of image and video models. The method further involves detecting text at a sampling interval. Moreover, the method involves generating viewports using salient frames, stabilizing the generated viewports to avoid the jittering effect, and creating a smooth video by cropping the viewports into a separate video. The method further involves generating transformations to ensure that a focus region does not fit into a default viewport, and automatically transforming the focus region to provide transformed images to a viewer. Furthermore, the method involves recreating the text that does not fully fit into a reframed output and involving background graphics or reproducing the text devoid of background graphics. If the text has background graphics, then the method involves recreating the text, or else to reproduce the text. In addition, the method involves obtaining output frames, by cropping the frames from the viewport and applying creative transformations and text transformations. Further, the method involves generating a transformed video by merging the cropped frames, adding the extracted audio, and uploading the reframed and transformed video into the cloud.

According to one embodiment of the present invention, the source video in different formats includes mp4 format, AVI, MOV, or WMV in different containers, extensions, and codecs.

According to one embodiment of the present invention, the audio is extracted from the source video using a multimedia processing tool, such as ffmpeg. The multimedia processing tool reads the input source video file, separates the audio track in the media from the video track, and saves the audio in WAV file format.

According to one embodiment of the present invention, the shot change points are the moments in the source video where a noticeable transition takes place, denoting a change in scenes or camera perspectives. These are important considerations for segmenting and analyzing videos. The shot change point detection relies heavily on visual data points. Furthermore, the visual data points include color distribution, motion patterns, and keyframe dissimilarities, among other visual features. These visual clues are used by an algorithm to detect changes in content or presentation style, and also accurately identify the exact moments when the shot change takes place.

According to one embodiment of the present invention, while detecting saliency each shot is processed individually, in which the frames are processed into batches, the motion is captured and the most focused region of the frames is provided as output, which is a salient frame.

According to one embodiment of the present invention, the saliency models help to identify visually prominent regions within the source video, and they mimic human visual attention mechanisms, highlighting areas that are likely to attract attention. The method for processing the source video through the saliency model is provided. The method includes extracting key features and generating saliency maps that highlight distinctive areas. For videos, temporal integration is often applied. The method further includes identifying significant regions of interest (ROIs) using generated saliency maps, which guide attention-weighted analysis. The extracted saliency information is valuable for various tasks, such as content summarization, object recognition, and adaptive video compression, enhancing the efficiency and effectiveness of video processing in diverse applications.

According to one embodiment of the present invention, text detection is performed at a sampling interval of 0.25 seconds to identify and extract textual information from images and videos. Furthermore, text detection involves detecting text horizontally, calculating the continuity of the text boxes, reading text using Optical Character Recognition (OCR), and generating a mask.

According to one embodiment of the present invention, the method for detecting the text is provided. The method involves improving the image quality through preprocessing and pinpointing potential text regions using edge detection. The method further involves analyzing the pinpointed potential text regions for distinctive features, such as texture and color. In addition, the method involves classifying the distinctive features as text or non-text using a machine learning model, and creating bounding boxes around detected text areas.

According to one embodiment of the present invention, detecting text horizontally involves calculating the orientation of text boxes using (x, y) coordinates of text boxes; eliminating all the text boxes that are at an angle greater than the threshold concerning the bottom border of the frame; and eliminating the text boxes that encompass vertical texts, to ensure that the text detected on screen is overlay text and not scene text.

According to one embodiment of the present invention, calculating the continuity of the text boxes involves calculating continuity on the screen based on text bounding boxes for each text box and if the text box is constantly present on screen for a threshold duration, then classifying the text as valid for retainment. The threshold duration is decided based on genre.

According to one embodiment of the present invention, reading text using Optical Character Recognition (OCR) is performed to eliminate false positives once continuous text segments are identified, and also the text bound boxes from OCR are used to identify tight-fit bounding boxes of continuous text on the screen.

According to one embodiment of the present invention, generating a mask involves creating a mask using the text bound boxes to isolate text in the frame to be re-created or reproduced. The generated mask is white when text is present on the screen, or black when text is not present.

According to one embodiment of the present invention, the method for generating viewports using salient frames is provided. The method includes processing the salient frames to obtain the most focused regions identified at high and low thresholds; iterating the process throughout the image to find the best fit for all the output viewports; dividing the image into multiple quadrants and calculating the spread of most focused region based on quadrant occupancies; feeding the spread and quadrant occupancies to a series of predefined rules and deciding the type of transformations required for each frame; and iterating the process for each of the salient frames to obtain viewports for each frame.

In addition, the predefined rules governing viewport generation involve a series of guidelines to determine the type of transformations required for each frame based on the analysis of salient frames. These rules include consideration to determine the binary threshold on the salient image to determine the spread of saliency and identifying focused regions to guide decisions on viewport size and position. This process thus generates the viewport of a particular size and the position it must be placed over the source video for creating the reframed frame.

According to one embodiment of the present invention, the method also provides selective configuration and choice of transformations on a per tenant, per genre, and per video basis. Each customer is provided a tenant, such that the assets invested in a tenant can typically be categorized into a specific genre based on the type of content within, such as General Entertainment Content (GEC), news debate, music video, etc. Music Videos are typically fast changing and with significant motion. News Debates could have multiple windows and rolling text in the frame, while General Entertainment Content might not have any of the above variations. Furthermore, the tenant can have multiple videos in its library spanning across the different genres possible. Also, each video needs to be transformed based on its underlying content. For instance, a "Creative Editor 1" can transform a video with two vertical windows whereas a "Creative Editor 2" can transform the same video with three vertical windows. Therefore, to accommodate this wide range of choice of transformations and creative requirements, the method provides configurations to choose transformations on a per tenant, per genre, and per video basis.

According to one embodiment of the present invention, text recreation involves blurring the text background and ensuring that the text does not overlap with any background graphics. The blurring of the text involves blurring the area in the frame where text bound boxes are present to avoid text overlap between frame text and recreated or reproduced text. The recreation of the text is carried out if there is background graphics on the text. While recreating the text, the text in the source frame is copied and placed over the blurred area in the output frame, and the text bounding boxes are expanded to encompass background graphics behind the text.

Moreover, text recreation comes into play when important text is situated in a screen area at risk of being cut off or failing to fit into the key viewport. This transformation method is specifically designed to recreate vital text elements, ensuring their visibility, even in regions that might otherwise be truncated. Text recreation proves particularly useful for videos containing crucial textual information that requires preservation despite spatial constraints.

According to one embodiment of the present invention, the reproduction of text is carried out when there is no background graphics on the text. The reproduction of the text is performed by reproducing the text in the source frame using text data which is identified using OCR on the blurred area in the output frame. The font of the reproduced text may be chosen at the time of video ingestion, and the reproduced text will have a shadow effect applied to it.

Moreover, reproducing text is basically, fitting the original text along with the actual background footage within the vertical viewport generated. Reproducing text is employed when significant text, such as titles or essential information, occupies a substantial portion of the screen. This transformation ensures the text fits within the viewport, with CLEAR AI text protection emphasizing its centrality. The surrounding content area is reduced, and a subtle blurred effect is introduced at the top and bottom, seamlessly integrating with the adjusted layout.

According to one embodiment of the present invention, the creative transformations are applied over the original horizontal frame, and converted to frames that are well suited to be viewed in vertical space. Further, the creative transformations include fit to saliency/fit to focus, full and focused, split vertical, fit to width, compact (vertical, horizontal, diagonal split), split in time, text recreation, and text protection.

The Fit to Focus is used when the content of interest is slightly wider than the destination vertical viewport can fit in. This transformation adjusts the framing of the video to ensure that the most important content is always in focus. Fit to Focus is ideal for videos with spread-out action or a relatively wider field of view. Correspondingly, the full and focused transformation is used when the spread of key attention content and action is even wider. This transformation ensures that the entire screen is utilized while keeping the most important content in focus. It is ideal for videos with a lot of action or a wide field of view. Similarly, split vertical is used when content has two key contextually significant people whose presence is split wide apart. This transformation splits the screen in two to ensure that both people are in focus, even if they are located on opposite sides of the screen. It is ideal for videos that feature two people in different parts of the frame.

Moreover, text recreation is utilized when important text is in a screen area at risk of being cut off or failing to fit into the key viewport. This transformation method is specifically designed to recreate vital text elements, ensuring their visibility, even in regions that might otherwise be truncated. Text recreation proves particularly useful for videos containing crucial textual information that requires preservation despite spatial constraints. Correspondingly, text protection involves fitting the original text along with the actual background footage within the vertical viewport being generated. Text protection is employed when significant text, such as titles or essential information, occupies a substantial portion of the screen. This transformation ensures the text fits within the viewport, with CLEAR AI text protection emphasizing its centrality. The surrounding content area is reduced, and a subtle blurred effect is introduced at the top and bottom, seamlessly integrating with the adjusted layout.

According to one embodiment of the present invention, the method also provides automatic reframing powered by spatio-temporal content analysis along with human detection. The spatio-temporal content analysis is used to identify the regions of interest in a video. This is based on the fact that, when a user watches the video, the user's eyes will automatically fixate on the most happening/interesting regions of the video. To identify this fixation in the video, the algorithm analyses a set of sequential frames to determine the regions where there is a significant amount of motion that sustains across the entire sequence of frames. Since the algorithm not only uses the information present in a frame but also the details of a given sequence of frames, this approach is referred to as a spatio-temporal analysis. Since the results of the spatio-temporal analysis are based on motion, when there is widespread motion involving multiple regions with the presence of humans, it can so happen that some of the regions with less motion but an interesting relevance are missed out. To overcome this shortcoming, user detection is employed and used to curate the final output.

According to one embodiment of the present invention, the method also recognizes automatically and eliminates the black bands and pillar bars in content before reframing. The black bands/pillar bars are post-production elements added to the video to adhere to the required aspect ratio. When a video with black bands/pillar bars is reframed, the black bands/pillar bars also form a part of the reframed content and have an undesirable viewing experience. To overcome this the algorithm identifies the presence of the bars/pillars as a pre-processing step and uses this information to remove these bands in the final reframed output.

According to one embodiment of the present invention, the method further includes performing a real-time ball tracking in sports videos (e.g., basketball, football) by: capturing one or more ball locations using object detection models or optimized zero-shot detection frameworks and shot-based processing with frames analyzed in batches, capturing one or more prominent regions in shots where the ball is present while excluding irrelevant shots (e.g., far-view, close-up shots of persons), handling misdetections and intermittent ball detection with interpolation based on previous and next ball locations, followed by a weighted average of ball locations to stabilize and handle shaky viewports for ensuring smooth tracking, and managing occlusions by predicting the ball's trajectory and re-identifying it post-occlusion.

According to one embodiment of the present invention, the method further includes generating a thumbnail by: extracting one or more key frames from the video at 1 frame per second (fps); filtering and ranking the one or more key frames based on the at least one of a) blurriness, where clear frames are ranked higher, b) person presence where the frames with the person are preferred, c) frontal face where the frames with frontal faces are ranked higher, d) key frames where the key frames are given a higher rank, and selecting the top k filtered frames as the final thumbnails.

According to one embodiment of the present invention, the method further includes overlaying of subtitle on reframe video by: processing the asset through a speech-to-text engine to generate subtitle files based on the horizontal video rules, modifying the generated subtitle to fit vertical video rules, and burning the subtitle file onto the reframed video.

According to one embodiment of the present invention, the method further includes overlaying of subtitle on reframe video by: burning the SRT file uploaded by the user during asset ingestion onto the reframed video.

According to one embodiment of the present invention, the method further includes overlaying a logo on reframe video by: integrating and burning the logo onto the reframed video to maintain consistent branding, choosing a desired position for the logo overlay by the user from at least one of a) top-left, b) top-right, c) bottom-left, d) bottom-right and e) center, and resizing the logo to fit the specific dimensions of the reframed video without losing clarity, and transparency and adjusting the opacity levels to ensure it blends well with the video content.

According to one embodiment of the present invention, a system for automatically reframing and transforming videos of different aspect ratios is provided. The term 'module' as used herein refers to a processor and a memory module that execute one or more software/firmware programs to provide the claimed functionality. Therefore, in accordance with the present invention, the terms 'input module,' 'audio extraction module,' 'frame extraction module,' 'saliency detection module,' 'text detection module,' 'viewport generation module,' 'viewport stabilization module,' 'transformation generation module,' 'text recreation module,' 'frame output module,' and 'video generation module' are implemented/executed by the combination of the processor and the memory module. Further, the features and functionalities associated with each of the aforementioned modules are realized/enabled by the combination of the processor and the memory module.

The system comprises an input module configured to acquire input comprising source video details in different formats, output reframed resolutions in which the source video is to be converted, and the genre of the source video. The system further comprises an audio extraction module configured to extract audio from the source video. In addition, the system comprises a frame extraction module configured to identify shot change points based on visual data points and extract frames from the input source video. The system further comprises a saliency detection module configured to detect saliency based on the input genre of the source video by processing the source video through saliency models, which are a combination of image and video models. Furthermore, the system comprises a text detection module configured to detect text at a sampling interval. The system further comprises a viewport generation module configured to generate viewports using salient frames, and a viewport stabilization module configured to stabilize the generated viewports to avoid the jittering effect and create a smooth video by cropping the viewports into a separate video. Furthermore, the system comprises a transformation generation module configured to generate transformations to ensure that a focus region does not fit into a default viewport, and automatically transforming the focus region to provide transformed images to a viewer. In addition, the system comprises a text recreation module configured to recreate text that does not fully fit into a reframed output and involves background graphics or configured to reproduce the text, that is devoid of background graphics. Furthermore, the system comprises a frame output module configured to provide output frames, by cropping the frames from the viewport and also configured to apply respective creative transformations and text transformations. In addition, the system comprises a video generation module configured to generate a transformed video by merging the cropped frames, adding the extracted audio by the audio extraction module to the transformed video, and also configured to upload the reframed and transformed video into the cloud.

According to one embodiment of the present invention, the source video in different formats includes mp4 format, AVI, MOV, or WMV in different containers, extensions, and codecs.

According to one embodiment of the present invention, the audio extracted by the audio extraction module from the source video uses a multimedia processing tool, such as ffmpeg. The multimedia processing tool is configured to read the input source video file, separate the audio track in the media from the video track, and save the audio in WAV file format.

According to one embodiment of the present invention, the shot change points identified by the frame extraction module are the moments in the source video where a noticeable transition takes place, denoting a change in scenes or camera perspectives. These are important considerations for segmenting and analyzing videos. The shot change point detection relies heavily on visual data points. Furthermore, the visual data points include color distribution, motion patterns, and keyframe dissimilarities, among other visual features. These visual clues are used by an algorithm to detect changes in content or presentation style, and also accurately identify the exact moments when the shot change takes place.

According to one embodiment of the present invention, while detecting saliency by the saliency detection module, each shot is processed individually, in which the frames are processed into batches, the motion is captured and the most focused region of the frames is provided as output, which is a salient frame.

According to one embodiment of the present invention, the saliency models of the saliency detection module are configured to identify visually prominent regions within the source video, and they mimic human visual attention mechanisms, highlighting areas that are likely to attract attention. Furthermore, the method for processing the source video through the saliency model by the saliency detection module is provided. The method involves extracting key features, generating saliency maps that highlight distinctive areas, and identifying significant regions of interest (ROIs) using generated saliency maps.

According to one embodiment of the present invention, text detection is performed by the text detection module at a sampling interval of 0.25 seconds, to identify and extract textual information from images and videos. The detection of text by the text detection module further involves detecting text horizontally, calculating the continuity of the text boxes, reading text using Optical Character Recognition (OCR), and generating a mask.

According to one embodiment of the present invention, the method for detecting the text by the text detection module is provided. The method involves improving the image quality through preprocessing and pinpointing potential text regions using edge detection. The method further involves analyzing the pinpointed potential text regions for distinctive features, such as texture and color. In addition, the method involves classifying the distinctive features as text or non-text using a machine-learning model and creating bounding boxes around detected text areas.

According to one embodiment of the present invention, detecting text horizontally by the text detection module involves calculating the orientation of text boxes using (x,y) coordinates of text boxes; eliminating all the text boxes that are at an angle greater than the threshold concerning the bottom border of the frame; and eliminating the text boxes that encompass vertical texts, to ensure that the text detected on screen is overlay text and not scene text.

According to one embodiment of the present invention, calculating the continuity of the text boxes by the text detection module involves calculating continuity on the screen based on text bounding boxes for each text box and if the text box is constantly present on screen for a threshold duration, then classifying the text as valid for retainment. The threshold duration is decided based on genre.

According to one embodiment of the present invention, reading text using Optical Character Recognition (OCR) by the text detection module is performed to eliminate false positives once continuous text segments are identified, and also the text bound boxes from OCR are used to identify tight-fit bounding boxes of continuous text on the screen.

According to one embodiment of the present invention, generating a mask by the text detection module involves creating a mask using the text bound boxes to isolate text in the frame to be re-created or reproduced. The generated mask is white when text is present on the screen, or black when text is not present.

According to one embodiment of the present invention, the method for generating viewports by the viewport generation module using salient frames is provided. The method includes processing the salient frames to obtain the most focused regions identified at high and low thresholds; iterating the process throughout the image to find the best fit for all the output viewports; dividing the image into multiple quadrants and calculating the spread of most focused region based on quadrant occupancies; feeding the spread and quadrant occupancies to a series of predefined rules and deciding the type of transformations required for each frame; and iterating the process for each of the salient frames to obtain viewports for each frame.

According to one embodiment of the present invention, the transformation generation module also provides selective configuration and choice of transformations on a per tenant, per genre, and per video basis. Each customer is provided a tenant, such that the assets invested in a tenant can typically be categorized into a specific genre based on the type of content within, such as General Entertainment Content (GEC), news debate, music video, etc. Music Videos are typically fast changing and with significant motion. News Debates could have multiple windows and rolling text in the frame, while General Entertainment Content might not have any of the above variations. Furthermore, the tenant can have multiple videos in its library spanning across the different genres possible. Also, each video needs to be transformed based on its underlying content. For instance, a "Creative Editor 1" can transform a video with two vertical windows whereas a "Creative Editor 2" can transform the same video with three vertical windows. Therefore, to accommodate this wide range of choice of transformations and creative requirements, the method provides configurations to choose transformations on a per tenant, per genre, and per video basis.

According to one embodiment of the present invention, the text recreation by the text recreation module involves blurring the text background and ensuring that the text does not overlap with any background graphics. The blurring of the text involves blurring the area in the frame where text bound boxes are present to avoid text overlap between frame text and recreated or reproduced text. The recreation of the text is carried out if there is background graphics on the text. While recreating the text, the text in the source frame is copied and placed over the blurred area in the output frame, and the text bounding boxes are expanded to encompass background graphics behind the text. The text recreation further includes identifying all possible text segments in the video frames, using Gen-AI to filter and classify text segments as on-screen text (OST) or background in-video text, and applying fit-text transformation to the filtered/identified OST segments for ensuring clear fitting of the actual On-Screen-text in the vertical reframed viewport.

According to one embodiment of the present invention, the reproduction of text is carried out by the text recreation module when there are no background graphics on the text and is performed by reproducing the text in the source frame using text data which is identified using OCR on the blurred area in the output frame. The font of the reproduced text is chosen at the time of video ingestion, and the reproduced text has a shadow effect applied to it.

According to one embodiment of the present invention, the creative transformations are applied by the frame output module over the original horizontal frame, and converted to frames that are well suited to be viewed in vertical space. The creative transformations include fit to saliency/fit to focus, full and focused, split vertical, fit to width, compact (vertical, horizontal, diagonal split), split in time, text recreation, and text protection.

According to one embodiment of the present invention, the frame output module also provides automatic reframing powered by spatio-temporal content analysis along with human detection. The spatio-temporal content analysis is used to identify the regions of interest in a video. This is based on the fact that, when a user watches the video, the user's eyes will automatically fixate on the most happening/interesting regions of the video. To identify this fixation in the video, the algorithm analyses a set of sequential frames to determine the regions where there is a significant amount of motion that sustains across the entire sequence of frames. Since the algorithm not only uses the information present in a frame but also the details of a given sequence of frames, this approach is referred to as a spatio-temporal analysis. Since the results of the spatio-temporal analysis are based on motion, when there is widespread motion involving multiple regions with the presence of humans, it can so happen that some of the regions with less motion but an interesting relevance are missed out. To overcome this shortcoming, user detection is employed and used to curate the final output.

According to one embodiment of the present invention, the frame output module also recognizes automatically and eliminates the black bands and pillar bars in content before reframing. The black bands/pillar bars are post-production elements added to the video to adhere to the required aspect ratio. When a video with black bands/pillar bars is reframed, the black bands/pillar bars also form a part of the reframed content and have an undesirable viewing experience. To overcome this the algorithm identifies the presence of the bars/pillars as a pre-processing step and uses this information to remove these bands in the final reframed output.

FIG. 1 illustrates a flowchart on a method for automatically reframing and transforming videos of different aspect ratios, according to an embodiment of the present invention. The method 100 comprises acquiring input comprising source video details in different formats, output reframed resolutions in which the source video is to be converted, and the genre of the source video at step 102. The method 100 further involves extracting audio from the source video at step 104. In addition, the method 100 involves identifying shot change points based on visual data points and extracting frames from the input source video at step 106. The method 100 further involves detecting saliency based on the input genre of the source video by processing the source video through saliency models at step 108. The saliency models are a combination of image and video models. The method 100 further involves detecting text at a sampling interval at 110. Moreover, the method 100 involves generating viewports using salient frames at step 112, stabilizing the generated viewports to avoid the jittering effect, and creating a smooth video by cropping the viewports into a separate video at step 114. The method 100 further involves generating transformations to ensure that a focus region does not fit into a default viewport, and automatically transforming the focus region to provide transformed images to a viewer at step 116. Furthermore, the method 100 involves recreating the text that does not fully fit into a reframed output and involving background graphics or reproducing the text devoid of background graphics at step 118. If the text has background graphics, then the method involves recreating the text, or else to reproduce the text. In addition, the method 100 involves obtaining output frames, by cropping the frames from the viewport and applying creative transformations and text transformations at step 120. Further, the method 100 involves generating a transformed video by merging the cropped frames, adding the extracted audio, and uploading the reframed and transformed video into the cloud at step 122.

Figure 2:
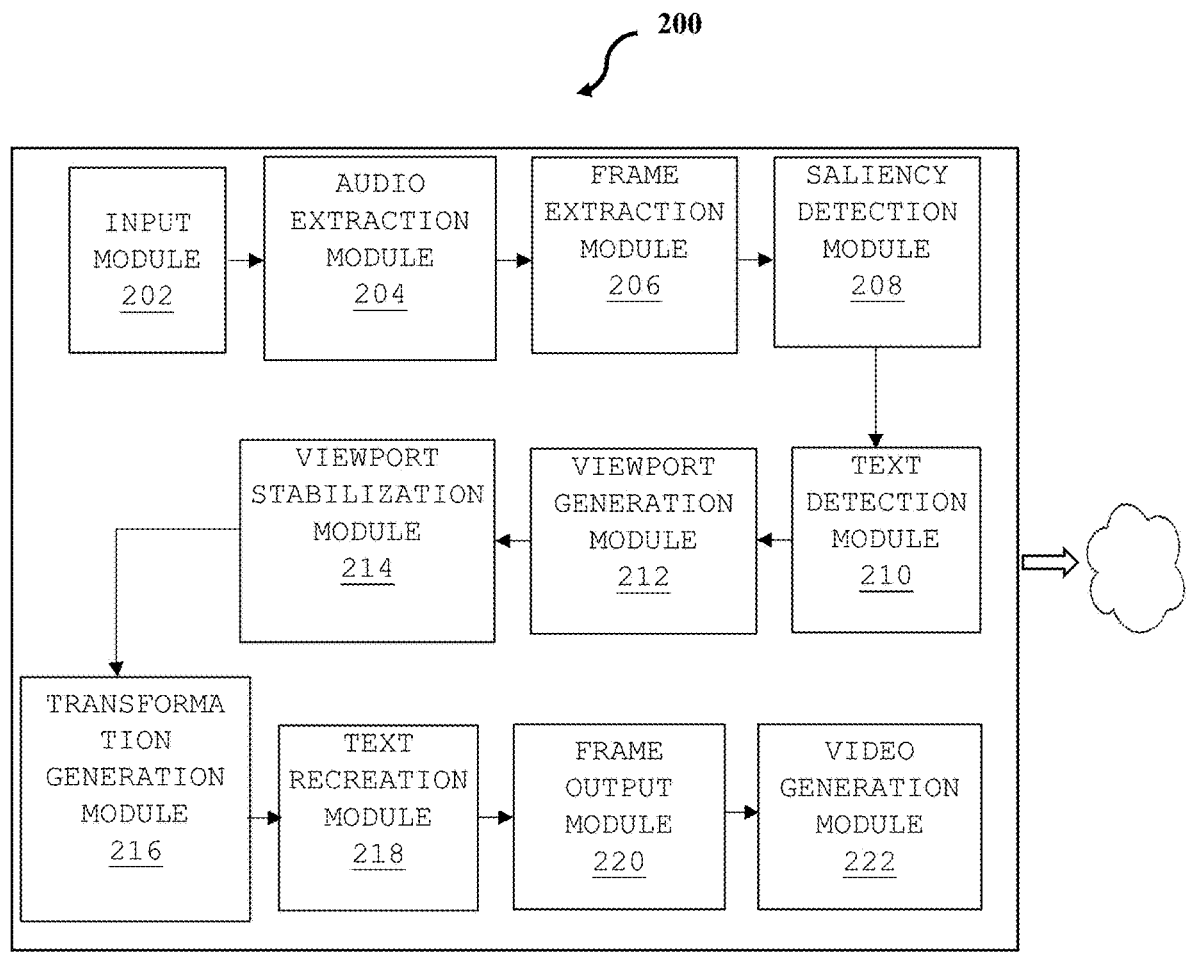
FIG. 2 illustrates a block diagram of an exemplary system for automatically reframing and transforming videos of different aspect ratios according to an embodiment of the present invention.

FIG. 2 illustrates a block diagram of an exemplary system for automatically reframing and transforming videos of different aspect ratios according to an embodiment of the present invention. The system 200 comprises an input module 202 configured to acquire input comprising source video details in different formats, output reframed resolutions in which the source video is to be converted, and the genre of the source video. The system 200 further comprises an audio extraction module 204 configured to extract audio from the source video. In addition, the system 200 comprises a frame extraction module 206 configured to identify shot change points based on visual data points and extract frames from the input source video. The system 200 further comprises a saliency detection module 208 configured to detect saliency based on the input genre of the source video by processing the source video through saliency models, which are a combination of image and video models. Furthermore, the system 200 comprises a text detection module 210 configured to detect text at a sampling interval. The system 200 further comprises a viewport generation module 212 configured to generate viewports using salient frames, and a viewport stabilization module 214 configured to stabilize the generated viewports to avoid the jittering effect and create a smooth video by cropping the viewports into a separate video. Furthermore, the system 200 comprises a transformation generation module 216 configured to generate transformations to ensure that a focus region does not fit into a default viewport, and automatically transforming the focus region to provide transformed images to a viewer. In addition, the system 200 comprises a text recreation module 218 configured to recreate text that does not fully fit into a reframed output and involves background graphics or configured to reproduce the text, that is devoid of background graphics. Furthermore, the system 200 comprises a frame output module 220 configured to provide output frames, by cropping the frames from the viewport and also configured to apply respective creative transformations and text transformations. In addition, the system 200 comprises a video generation module 222 configured to generate a transformed video by merging the cropped frames, adding the extracted audio by the audio extraction module to the transformed video, and also configured to upload the reframed and transformed video into the cloud.

Figure 3:
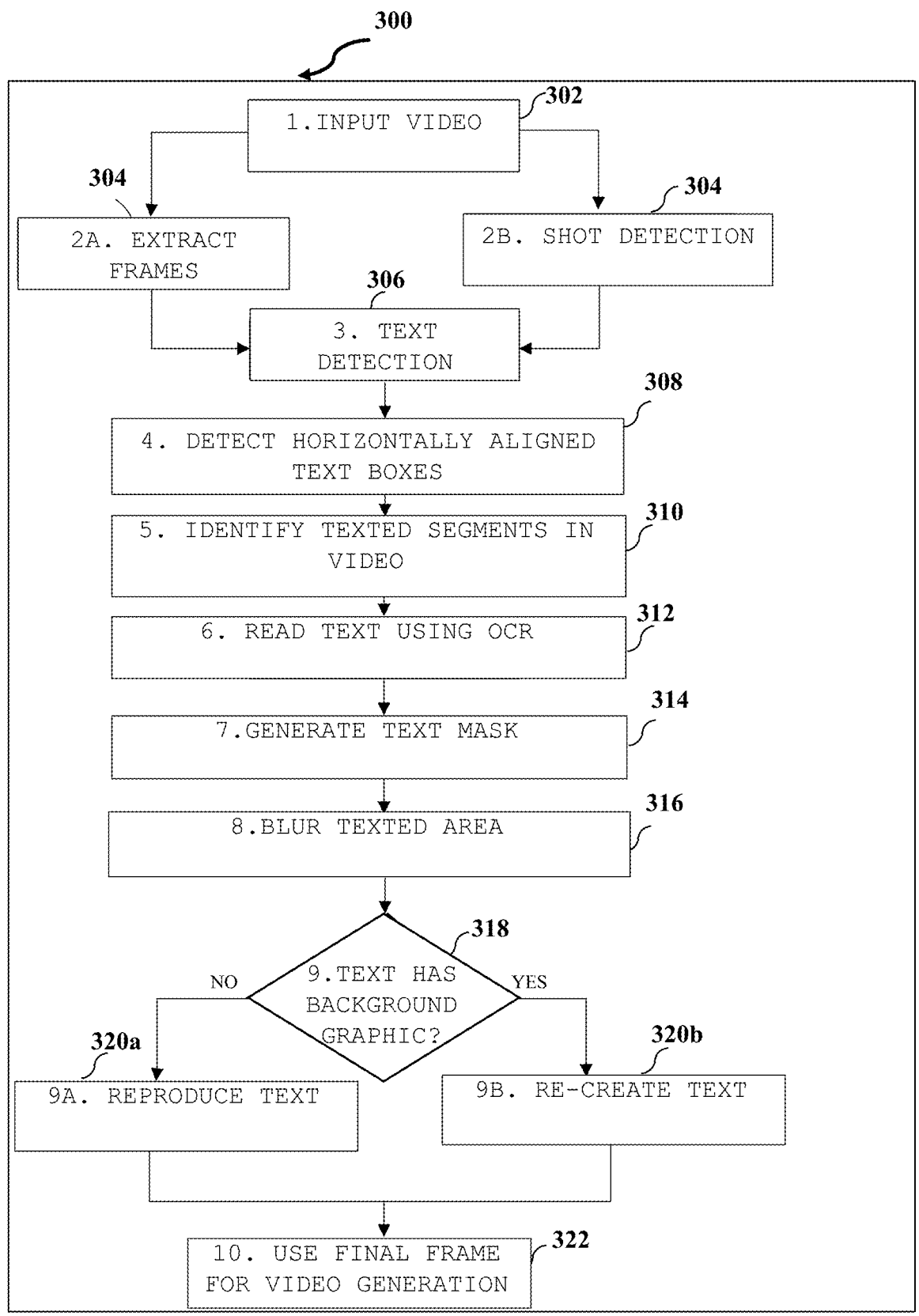
FIG. 3 illustrates a flowchart on a method for text recreation, according to an embodiment of the present invention.

FIG. 3 illustrates a flowchart on a method for text recreation, according to an embodiment of the present invention. The method 300 comprises acquiring input video at step 302. The input video comprises source video in various formats, such as mp4 format, AVI, MOV, WMV, etc., in different containers, extensions, and codecs. In addition, the output reframed resolutions in which the source video is to be converted, and the genre of the source video is also taken as input. The method 300 further comprises extracting frames and detecting shots at step 304. In addition, the method 300 involves detecting text at step 306, such that the text detection is performed at a sampling interval of 0.25 seconds. The method 300 further involves detecting horizontally aligned textboxes at step 308, and identifying texted segments in video at step 310, such that the algorithm retains overlaid textual content that is necessary and informative. For instance, the name and title of an interviewer/interviewee appearing in a news debate need to be shown on the reframed video, such that to achieve this, the method is provided with a text detection step to automatically detect regions of text in a frame, analyze their continuity across consecutive frames and determine whether the text needs to be reproduced or retained in the reframed output. Furthermore, the method involves reading text using Optical Character Recognition (OCR) at step 312 and generating a mask at step 314. The detecting horizontally aligned textboxes at step 308 involves calculating the orientation of text boxes using (x, y) coordinates of text boxes; eliminating all the text boxes that are at an angle greater than the threshold with respect to the bottom border of the frame; and eliminating the text boxes that encompass vertical texts, to ensure that the text detected on screen is overlay text and not scene text at step 310. Further, reading text using Optical Character Recognition (OCR) at step 312 involves eliminating the false positives once continuous text segments are identified; and using text bound boxes from OCR to identify tight-fit bounding boxes of continuous text on the screen. Moreover, generating mask at step 314 involves creating a mask using the text bound boxes to isolate text in the frame to be re-created or reproduced. The generated mask is white, when text is present on the screen, or else black. The method 300 further comprises blurring the texted area at step 316 and ensuring that the text has any background graphics at step 318. If the text has background graphics, then the method 300 involves recreating the text at step 320*b*, or else reproducing the text at step 320*a*. Further, the recreated text or reproduced text is used for generating the video at step 322.

Figure 4:
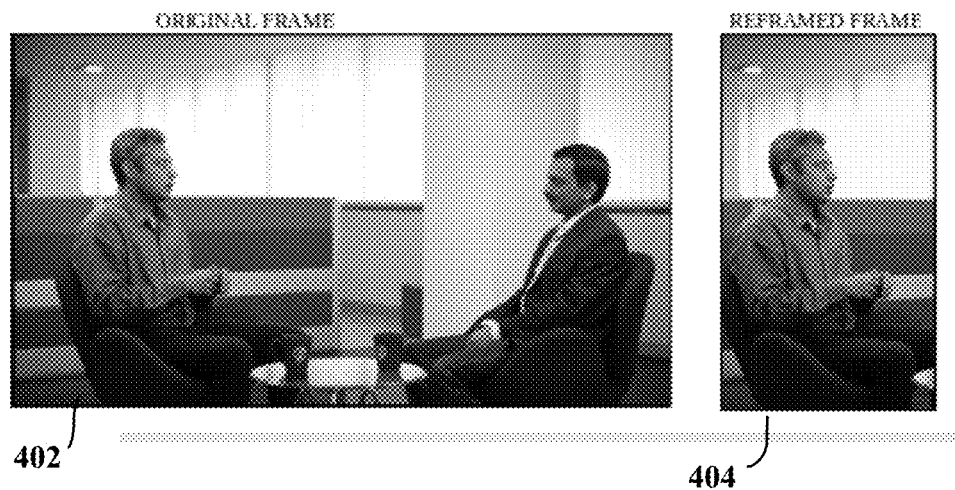
FIG. 4 illustrates a screen shot of automatically reframing and transforming horizontal video into vertical video, according to an embodiment of the present invention.

FIG. 4 illustrates a screen shot of automatically reframing and transforming horizontal video into vertical video, according to an embodiment of the present invention. FIG. 4 illustrates a screen shot of an original frame 402 and a reframed and transformed frame 404 from one aspect ratio to another aspect ratio while maintaining the visibility of regions of interest. The reframed and transformed videos are ready-to-distribute videos to social media platforms by retaining contextually important text and moments and rapidly monetizing content.

Figure 5:
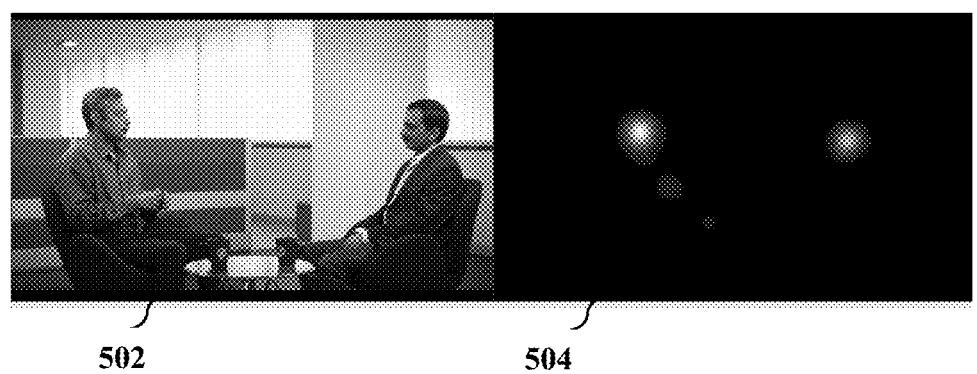
FIG. 5 illustrates a sample image of a frame with a salient region, according to an embodiment of the present invention.

FIG. 5 illustrates a sample image of a frame with a salient region, according to an embodiment of the present invention. FIG. 5 illustrates an image of frame 502 with salient region 504, which are visually prominent regions within a source video. The salient regions are designed to mimic human visual attention mechanisms, highlighting areas that are likely to attract attention.

Figure 6A:
FIG. 6A illustrates Full and Focused transformation, according to an embodiment of the present invention.
Figure 6A:
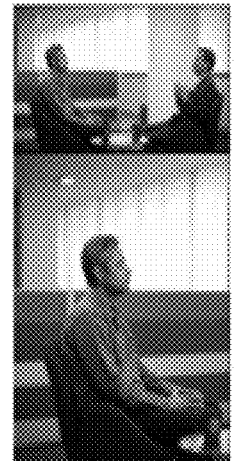
Figure 6B:
FIG. 6B illustrates Fit to Focus transformation, according to an embodiment of the present invention.
Figure 6B:
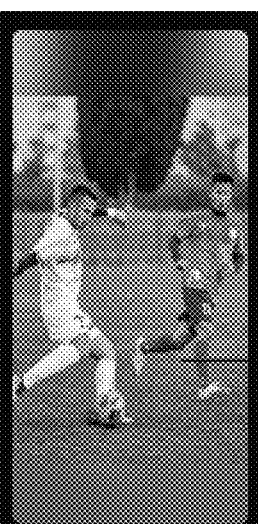
Figure 6C:
FIG. 6C illustrates split-vertical transformation, according to an embodiment of the present invention.
Figure 6D:
FIG. 6D illustrates text-recreation transformation, according to an embodiment of the present invention.
Figure 6E:
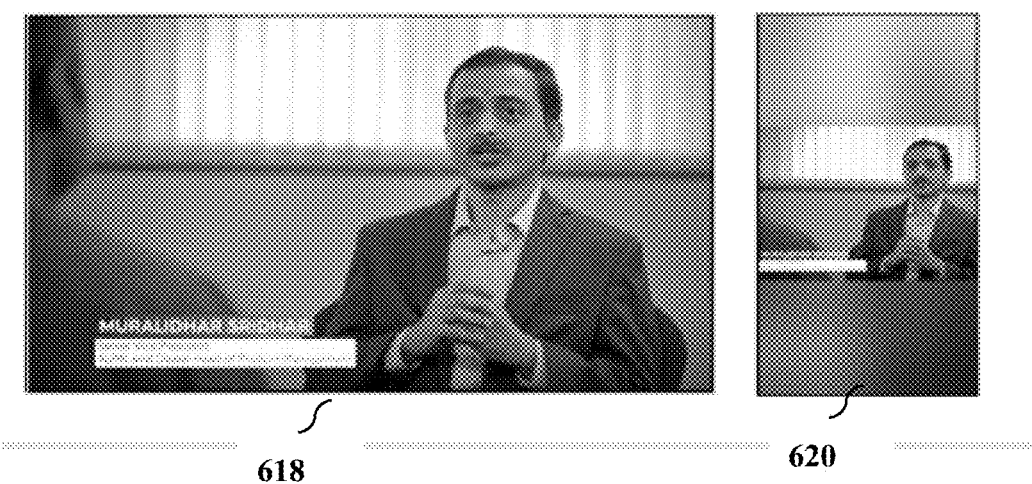
FIG. 6E illustrates text protection transformation, according to an embodiment of the present invention.

FIG. 6A illustrates Full and Focused transformation, according to an embodiment of the present invention. Full and Focused transformation is used when the spread of key attention content and action is even wider. This transformation ensures that the entire screen is utilized, while keeping the most important content in focus. FIG. 6A depicts an original frame 602 and a transformed frame 604. It is ideal for videos with a lot of action or a wide field of view. FIG. 6B illustrates Fit to Focus transformation, according to an embodiment of the present invention. Fit to Focused transformation is used when the content of interest is slightly wider than the destination vertical viewport can fit in. This transformation adjusts the framing of the video to ensure that the most important content is always in focus. It is ideal for videos with spread-out action or a relatively wider field of view. FIG. 6B depicts the original frame 606 and a transformed frame 608. FIG. 6C illustrates split-vertical transformation, according to an embodiment of the present invention. Split-vertical is used when content has two key contextually significant people whose presence is split wide apart. This transformation splits the screen in two to ensure that both people are in focus, even if they are located on opposite sides of the screen. FIG. 6C depicts the original frame 610 and split frame 612. It is ideal for videos that feature two people in different parts of the frame. FIG. 6D illustrates text-recreation transformation, according to an embodiment of the present invention. Text recreation is used when important text is in a screen area at risk of being cut off or failing to fit into the key viewport. This transformation method is specifically designed to recreate vital text elements, ensuring their visibility, even in regions that might otherwise be truncated. It proves particularly useful for videos containing crucial textual information that requires preservation despite spatial constraints. FIG. 6D depicts the original frame 614 and recreated frame 616. FIG. 6E illustrates text protection transformation, according to an embodiment of the present invention. Text protection fits the original text along with the actual background footage within the vertical viewport generated. Text protection is employed when significant text, such as titles or essential information, occupies a substantial portion of the screen. This transformation ensures the text fits within the viewport, with CLEAR AI text protection emphasizing its centrality. The surrounding content area is reduced, and a subtle blurred effect is introduced at the top and bottom, seamlessly integrating with the adjusted layout. FIG. 6E depicts the original frame 618 and transformed frame 620.

Figure 6F:
FIG. 6F illustrates thumbnail generation and logo overlay, according to an embodiment of the present invention.

FIG. 6F illustrates thumbnail generation and logo overlay, according to an embodiment of the present invention. In an embodiment, one or more key frames are extracted from the video at 1 frame per second (fps). The key frames are filtered and ranked based on at least one of a) blurriness, where clear frames are ranked higher, b) person presence, where frames with persons are preferred, c) frontal face, where frames with frontal faces are ranked higher, d) key frames, where key frames are given a higher rank. The top k filtered frames are selected as the final thumbnails. In some embodiments, as depicted in FIG. 6F, logo is overlayed on reframe video 622 to obtain overlayed video 624. If a logo is provided, it is integrated and burnt onto the reframed video to maintain consistent branding. Users can choose the desired position for the logo overlay from the following options: Top-left, Top-right, Bottom-left, Bottom-right, and Centered. The input logo is resized to fit the specific dimensions of the reframed video without losing clarity, and transparency and opacity levels can be adjusted to ensure they blend well with the video content.

Figure 6G:
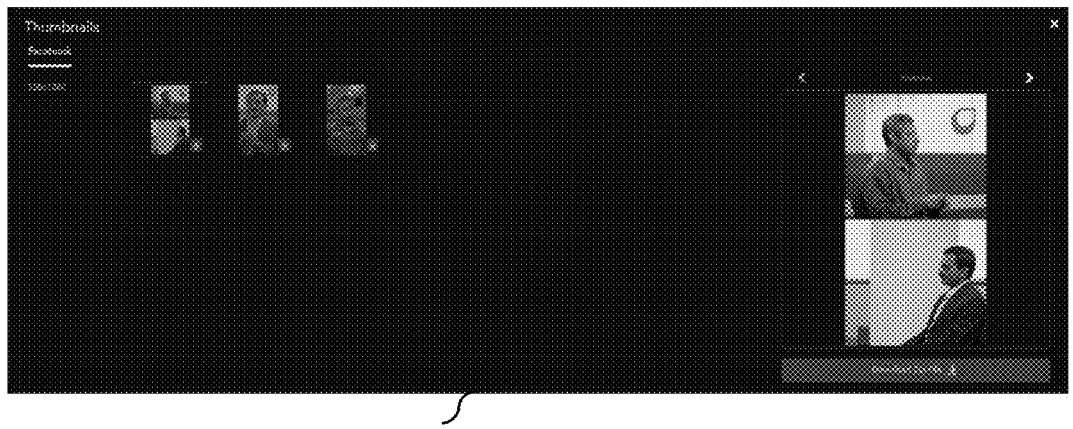
FIG. 6G illustrates overlay subtitle onto reframed video, according to an embodiment of the present invention.

FIG. 6G illustrates overlay subtitle onto reframed video 626, according to an embodiment of the present invention. In some embodiments, the reframed video is sent as is without any subtitle overlay. Where an auto generated subtitle is used, the asset is processed through a speech-to-text engine (either a 3rd party or CLEAR-AI STT engine, depending on configuration) to generate subtitle files based on the horizontal video rules. The generated subtitle is modified to fit the vertical video rules. For example, two lines in horizontal video may be split into four lines in vertical format. Options like word wrap are provided to display groups of words as they are spoken, ensuring they occupy a maximum of two lines at a time. Finally, the SRT (subtitle) file is burnt-in onto the reframed video. In case, the user uploads the SRT file, then the SRT file uploaded by the user during asset ingestion is used directly, and no speech-to-text engine is triggered. Finally, the user-uploaded SRT file is burnt-in onto the reframed video The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

The present invention provides a method and system for automatically reframing and transforming videos of different aspect ratios. The method envisages converting a horizontal video into a vertical video without losing the track of the most significant movement in each clip. The present invention provides numerous advantages such as multiple content variants, ready-to-distribute videos to all social media platforms, retaining contextually important texts and moments, and monetizing content quickly. The present invention provides multiple content variants by adding more power and intelligence to the content transformation journey to effortlessly create more content variations and genre-specific transformations. The present invention also enables the conversion of horizontal videos automatically and accurately into square, portrait, and vertical formats non-linearly at scale. The present invention can also auto-detect graphic elements, lower thirds, etc., and auto-reframe existing or new videos for various social media platforms.

Furthermore, the present invention is envisaged to provide ready-to-distribute videos for numerous social media platforms by providing videos in the form of stories, posts, and shorts, which the user can either download the reframed video to edit further or directly post the videos on social media platforms. In addition, the present invention helps to retain contextually important text and moments by automatically identifying text elements that do not fit into the reframed video, re-creating the text from the original to fit into the reframed video, and placing it with creative finesse.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

We claim:

1. A method for automatically reframing and transforming videos of different aspect ratios, the method comprising the steps of:

acquiring an input, said input comprising a source video in different formats, information regarding reframed resolutions into which the source video is to be converted, and information regarding a genre of the source video;

extracting audio from the source video;

identifying shot change points based on visual data points and extracting frames from the source video, wherein the shot change points are moments in the source video where a noticeable transition takes place, thereby denoting a change in scenes or camera perspectives, and wherein said visual data points include colour distribution, motion patterns, and keyframe dissimilarities, and wherein said visual data points are used to detect changes in content and presentation style and to accurately identify exact moments when the shot change takes place;

processing each of the frames of the source video and individually processing shots of the source video, and capturing motion from each of the shots of the source video, and identifying a most-focused region of each of the frames as salient frames;

identifying visually prominent regions within the source video and extracting key features from the source video, and generating saliency maps that highlight distinctive areas in the source video;

identifying significant regions of interest (ROIs) in the source video using the saliency maps;

detecting text from the source video at predetermined sampling intervals, and wherein detecting the text from the source video further includes pinpointing potential text regions using edge detection, analyzing pinpointed potential text regions for distinctive features, including texture and colour, classifying the distinctive features as text and non-text, and creating bounding boxes around detected text areas;

generating viewports using the salient frames, and wherein the step of generating the viewports includes steps of:
obtaining the most focused region of each of the salient frames at a high threshold and a low threshold;
dividing each of the salient frames into multiple quadrants and calculating the spread of the most focused region of each of the salient frames based on quadrant occupancies; and
feeding the spread and the quadrant occupancies to a series of predefined rules to determine at least one transformation required to be applied for the most focused region of each of the salient frames;

applying said at least one transformation to automatically transform the most focused region of each of the salient frames and generating transformed frames;

obtaining output frames by cropping the transformed frames, and generating a transformed video by merging cropped frames and adding extracted audio.

2. The method as claimed in claim 1, wherein the audio is extracted from the source video using a multimedia processing tool, and wherein the multimedia processing tool reads a source video file and separates an audio track from a video track, and saves the audio track in WAV file format.

3. The method as claimed in claim 1, wherein text detection is performed at a sampling interval of 0.25 seconds to identify and extract textual information from the source video, and wherein the text detection further includes detecting the textual information horizontally, calculating continuity of text boxes in the source video, reading the textual information using Optical Character Recognition (OCR) and generating corresponding text data, and generating a mask to isolate text in the frames to be recreated or reproduced.

4. The method as claimed in claim 3, wherein detecting the textual information horizontally comprises steps of:
calculating an orientation of text boxes using x and y coordinates of the text boxes;
eliminating the text boxes that are at an angle greater than a threshold concerning a bottom border of a frame of the source video; and
eliminating the text boxes that encompass vertical texts to ensure that the textual information detected on screen is overlay text and not scene text.

5. The method as claimed in claim 1, wherein the method further includes recreating the textual information that does not entirely fit into the output frames in an event the textual information includes background graphics, and reproducing the textual information in an event the textual information does not include the background graphics, and wherein:
the step of recreating the textual information further includes:
blurring a background of the textual information, and wherein the blurring of the textual information includes blurring an area of the output frames where text-bound boxes are present, thereby avoiding text overlap between the textual information originally present in the frames of the source video and recreated textual information; and
identifying all possible text segments in the frames of the source video and classifying the text segments as on-screen text (OST) segments and background in-video text segments, and applying a fit-text transformation to the OST segments to fit on-screen text in a vertical reframed viewport; and
the step of reproducing the textual information includes reproducing, based on the text data identified by said OCR, the textual information on a blurred area of the output frames, and wherein a font of reproduced textual information is selected during ingestion of the transformed video.

6. The method (100) as claimed in claim 1, wherein said at least one transformation is selected from a group of transformations consisting of fit-to-saliency transformation, fit-to-focus transformation, full and focused transformation, vertical split transformation, fit-to-width transformation, compact transformation, split-in-time transformation, text recreation transformation, and text protection transformation, and wherein said at least one transformation is applied onto horizontally oriented frames of the source video to transform said horizontally oriented frames into vertically oriented frames suitable for viewing in a vertical space.

7. The method as claimed in claim 1, wherein said method is further configured to perform real-time ball tracking in sports-related videos by:
capturing one or more ball locations by analyzing the frames of the sports-related video;
capturing, from the frames, one or more prominent regions in shots where the ball is present while excluding irrelevant shots;
handling misdetections and intermittent ball detection with interpolation based on ball location in a preceding shot and a succeeding shot respectively, and by calculating a weighted average of ball locations in each of the shots; and
managing occlusions by predicting the ball trajectory and by re-identifying the ball trajectory post occlusion.

8. The method as claimed in claim 1, further comprises generating a thumbnail by:
extracting one or more keyframes from the source video at a predetermined frame rate; and
filtering and ranking the keyframes based on at least one of blurriness, presence of a person in any of the keyframes, presence of a frontal face in any of the keyframes; and
selecting top-ranked keyframe as the thumbnail.

9. The method as claimed in claim 1, wherein the method further comprises overlaying of subtitles on a transformed video by:
processing the source video through a speech-to-text engine to generate subtitle files based on horizontal video rules;
modifying the generated subtitles to fit vertical video rules; and integrating the modified subtitles into the transformed video.

10. The method as claimed in claim 3, wherein the step of calculating the continuity of the text boxes further includes classifying the textual information as valid for retainment if the text box is constantly present on screen for a threshold duration.

11. A computer-based system for automatically reframing and transforming videos of different aspect ratios, the system comprising:
   a processor;
   at least one memory module storing computer program code and communicably coupled to said processor, wherein said memory module and said computer program code stored therein are configured, with said processor, to cause said computer-based system to:
      acquire an input, said input comprising a source video in different formats, information regarding reframed resolutions into which the source video is to be converted, and information regarding a genre of the source video;
      extract audio from the source video;
      identify shot change points based on visual data points and extract frames from the source video, wherein the shot change points are moments in the source video where a noticeable transition takes place, thereby denoting a change in scenes or camera perspectives, and wherein said visual data points include colour distribution, motion patterns, and keyframe dissimilarities, and wherein said visual data points are used to detect changes in content and presentation style and to accurately identify exact moments when the shot change takes place;
      process each of the frames of the source video and individually process shots of the source video;
      capture motion from each of the shots of the source video, and identify a most-focused region of each of the frames as salient frames;
      identify visually prominent regions within the source video and extract key features from the source video, and generate saliency maps that highlight distinctive areas in the source video;
      identifying significant regions of interest (ROIs) in the source video using the saliency maps;
      detect text from the source video at predetermined sampling intervals, said processor further configured to pinpoint potential text regions using edge detection, analyze pinpointed potential text regions for distinctive features, including texture and colour, classify the distinctive features as text and non-text, and create bounding boxes around detected text areas;
      generate viewports using the salient frames by:
         obtaining the most focused region of each of the salient frames at a high threshold and a low threshold;
         dividing each of the salient frames into multiple quadrants and calculating the spread of the most focused region of each of the salient frames based on quadrant occupancies; and
         feeding the spread and the quadrant occupancies to a series of predefined rules to determine at least one transformation required to be applied for the most focused region of each of the salient frames;
      apply said at least one transformation to automatically transform the most focused region of each of the salient frames and generate transformed frames;
      obtain output frames by cropping the transformed frames, and generate a transformed video by merging cropped frames and adding extracted audio.

12. The system as claimed in claim 11, wherein said processor is further configured to:
   extract the audio from the source video using a multimedia processing tool, and wherein the multimedia processing tool reads a source video file, separates an audio track from a video track, and saves the audio track in WAV file format;
   perform text detection at a sampling interval of 0.25 seconds and identify and extract textual information from the source video, said processor further configured to detect the textual information horizontally, calculate continuity of text boxes in the source video, read the textual information using Optical Character Recognition (OCR) and generate corresponding text data, and generate a mask for isolating text in the frames to be recreated or reproduced,
   detect the textual information horizontally by:
      calculating an orientation of text boxes using x and y coordinates of the text boxes;
      eliminating the text boxes that are at an angle greater than a threshold concerning a bottom border of a frame of the source video; and
      eliminating the text boxes that encompass vertical texts to ensure that the textual information detected on screen is overlay text and not scene text.

13. The system as claimed in claim 11, wherein the processor is configured to recreate the textual information that does not entirely fit into the output frames in an event the textual information includes background graphics, said processor further configured to reproduce the textual information in an event the textual information does not include the background graphics, said processor further configured to:
   recreate the textual information by:
      blurring a background of the textual information, and wherein the blurring of the textual information includes blurring an area of the output frames where text-bound boxes are present, thereby avoiding text overlap between the textual information originally present in the frames of the source video and recreated textual information; and
      identifying all possible text segments in the frames of the source video and classifying the text segments as on-screen text (OST) segments and background in-video text segments, and applying a fit-text transformation to the OST segments to fit on-screen text in a vertical reframed viewport; and
   reproduce, based on the text data identified by said OCR, the textual information on a blurred area of the output frames, and wherein a font of reproduced textual information is selected during ingestion of the transformed video.

14. The system as claimed in claim 11, wherein said at least one transformation is selected from a group of transformations consisting of fit-to-saliency transformation, fit-to-focus transformation, full and focused transformation, vertical split transformation, fit-to-width transformation, compact transformation, split-in-time transformation, text recreation transformation, and text protection transformation, and wherein said processor applies said at least one transformation on horizontally oriented frames of the source video and transforms said horizontally oriented frames into vertically oriented frames suitable for viewing in a vertical space.

15. The system as claimed in claim 11, wherein said processor is further configured to:
- perform real-time ball tracking in sports-related videos by:
  - capturing one or more ball locations by analyzing the frames of the sports-related video;
  - capturing, from the frames, one or more prominent regions in shots where the ball is present while excluding irrelevant shots;
  - handling misdetections and intermittent ball detection with interpolation based on ball location in a preceding shot and a succeeding shot respectively, and by calculating a weighted average of ball locations in each of the shots; and
  - managing occlusions by predicting the ball trajectory and by re-identifying the ball trajectory post occlusion;
- generate a thumbnail by:
  - extracting one or more keyframes from the source video at a predetermined frame rate; and
  - filtering and ranking the keyframes based on at least one of blurriness, presence of a person in any of the keyframes, presence of a frontal face in any of the keyframes; and
  - selecting top-ranked keyframe as the thumbnail;
- overlay of subtitles on a transformed video by:
  - processing the source video through a speech-to-text engine to generate subtitle files based on horizontal video rules;
  - modifying the generated subtitles to fit vertical video rules; and
  - integrating the modified subtitles into the transformed video.

16. The system as claimed in claim 12, wherein the processor calculates the continuity of the text boxes by classifying the textual information as valid for retainment if the text box is constantly present on screen for a threshold duration.

17. A non-transitory computer-readable storage medium having computer-executable instructions stored thereon, said computer-executable instructions, when executed by a computer-based processor, cause said processor to:
- acquire an input, said input comprising a source video in different formats, information regarding reframed resolutions into which the source video is to be converted, and information regarding a genre of the source video;
- extract audio from the source video;
- identify shot change points based on visual data points and extract frames from the source video, wherein the shot change points are moments in the source video where a noticeable transition takes place, thereby denoting a change in scenes or camera perspectives, and wherein said visual data points include colour distribution, motion patterns, and keyframe dissimilarities, and wherein said visual data points are used to detect changes in content and presentation style and to accurately identify exact moments when the shot change takes place;
- process each of the frames of the source video and individually process shots of the source video;
- capture motion from each of the shots of the source video, and identify a most-focused region of each of the frames as salient frames;
- identify visually prominent regions within the source video and extract key features from the source video, and generate saliency maps that highlight distinctive areas in the source video;
- identifying significant regions of interest (ROIs) in the source video using the saliency maps;
- detect text from the source video at predetermined sampling intervals, said processor further configured to pinpoint potential text regions using edge detection, analyze pinpointed potential text regions for distinctive features, including texture and colour, classify the distinctive features as text and non-text, and create bounding boxes around detected text areas;
- generate viewports using the salient frames by:
  - obtaining the most focused region of each of the salient frames at a high threshold and a low threshold;
  - dividing each of the salient frames into multiple quadrants and calculating the spread of the most focused region of each of the salient frames based on quadrant occupancies; and
  - feeding the spread and the quadrant occupancies to a series of predefined rules to determine at least one transformation required to be applied for the most focused region of each of the salient frames;
- apply said at least one transformation to automatically transform the most focused region of each of the salient frames and generate transformed frames;
- obtain output frames by cropping the transformed frames, and generate a transformed video by merging cropped frames and adding extracted audio.

18. The computer-executable instructions as claimed in claim 17, when executed by said computer-based processor, further cause said processor to:
- extract the audio from the source video using a multimedia processing tool, and wherein the multimedia processing tool reads a source video file, separates an audio track from a video track, and saves the audio track in WAV file format;
- perform text detection at a sampling interval of 0.25 seconds and identify and extract textual information from the source video, said processor further configured to detect the textual information horizontally, calculate continuity of text boxes in the source video, read the textual information using Optical Character Recognition (OCR) and generate corresponding text data, and generate a mask for isolating text in the frames to be recreated or reproduced,
- detect the textual information horizontally by:
  - calculating an orientation of text boxes using x and y coordinates of the text boxes;
  - eliminating the text boxes that are at an angle greater than a threshold concerning a bottom border of a frame of the source video; and
  - eliminating the text boxes that encompass vertical texts to ensure that the textual information detected on screen is overlay text and not scene text.

19. The computer-executable instructions as claimed in claim 17, when executed by said computer-based processor, further cause said processor to:
- recreate the textual information that does not entirely fit into the output frames in an event the textual information includes background graphics, and reproduce the textual information in an event the textual information does not include the background graphics;
- and wherein said computer-executable instructions further cause said processor to recreate the textual information by:
  - blurring a background of the textual information, and wherein the blurring of the textual information includes blurring an area of the output frames where text-bound boxes are present, thereby avoiding text overlap between the textual information originally present in the frames of the source video and recreated textual information; and identifying all possible text segments in the frames of the source video and classifying the text segments as on-screen text (OST) segments and background in-video text segments, and applying a fit-text transformation to the OST segments to fit on-screen text in a vertical reframed viewport; and and wherein said computer-executable instructions further cause said processor to reproduce, based on the text data identified by said OCR, the textual information on a blurred area of the output frames, and wherein a font of reproduced textual information is selected during ingestion of the transformed video;

and wherein said computer-executable instructions further cause said processor to select said at least one transformation from a group consisting of fit-to-saliency transformation, fit-to-focus transformation, full and focused transformation, vertical split transformation, fit-to-width transformation, compact transformation, split-in-time transformation, text recreation transformation, and text protection transformation, and wherein said computer-executable instructions further cause said processor to apply said at least one transformation on horizontally oriented frames of the source video and transform said horizontally oriented frames into vertically oriented frames suitable for viewing in a vertical space.

20. The computer-executable instructions as claimed in claim 17, when executed by said computer-based processor, further cause said processor to:

perform real-time ball tracking in sports-related videos by:
- capturing one or more ball locations by analyzing the frames of the sports-related video;
- capturing, from the frames, one or more prominent regions in shots where the ball is present while excluding irrelevant shots;
- handling misdetections and intermittent ball detection with interpolation based on ball location in a preceding shot and a succeeding shot respectively, and by calculating a weighted average of ball locations in each of the shots; and
- managing occlusions by predicting the ball trajectory and by re-identifying the ball trajectory post occlusion;

generate a thumbnail by:
- extracting one or more keyframes from the source video at a predetermined frame rate; and
- filtering and ranking the keyframes based on at least one of blurriness, presence of a person in any of the keyframes, presence of a frontal face in any of the keyframes; and
- selecting top-ranked keyframe as the thumbnail;

overlay of subtitles on a transformed video by:
- processing the source video through a speech-to-text engine to generate subtitle files based on horizontal video rules;
- modifying the generated subtitles to fit vertical video rules; and
- integrating the modified subtitles into the transformed video.

* * * * *